(12) United States Patent
Donohue

(10) Patent No.: US 10,004,220 B2
(45) Date of Patent: Jun. 26, 2018

(54) ANTI-BIRD COVER FOR A WATERCRAFT

(71) Applicant: Carol Donohue, Cadillac, MI (US)

(72) Inventor: Carol Donohue, Cadillac, MI (US)

( * ) Notice: Subject to any disclaimer, the term of this patent is extended or adjusted under 35 U.S.C. 154(b) by 0 days. days.

(21) Appl. No.: 15/238,510

(22) Filed: Aug. 16, 2016

(65) Prior Publication Data

US 2018/0049427 A1    Feb. 22, 2018

(51) Int. Cl.
 *B63B 17/00*  (2006.01)
 *A01M 29/32* (2011.01)
 *B63B 59/00*  (2006.01)

(52) U.S. Cl.
 CPC ............. *A01M 29/32* (2013.01); *B63B 59/00* (2013.01); *B63B 2710/00* (2013.01)

(58) Field of Classification Search
 CPC ................................ A01M 29/32; B63B 59/00
 See application file for complete search history.

(56) References Cited

U.S. PATENT DOCUMENTS

| 6,082,285 A * | 7/2000 | Hinrichs ............... A01M 29/32 114/343 |
| 7,316,175 B2 * | 1/2008 | Safwat ................... A01K 75/00 87/53 |
| 2003/0226846 A1 * | 12/2003 | Horwath .................. B65F 1/16 220/287 |

* cited by examiner

*Primary Examiner* — Stephen P Avila
(74) *Attorney, Agent, or Firm* — Heed Law Group; Thomas P. Heed

(57) ABSTRACT

An anti-bird cover for a watercraft uses planar sheet of plastic netting with a small, but not micro, aperture to deter birds from perching. The aperture is formed by a plurality of filaments and knots. The filaments are between 0.25" and 2.00" in length, with the illustrated embodiment having filaments of 0.75". The plastic netting is formed from nylon, polypropylene ("PP"), high-density polyethylene ("HDPE"), and low-density polyethylene ("LDPE"). The perimeter of the netting is encircled by an elastic gather with two free ends. The two free ends of the elastic gather are captured by a bungee cord stop. The surface area of the planar sheet of plastic netting is 1.5 time the surface area of the watercraft to be covered, in order to make the present invention billow in the wind, thus deterring birds from perching.

15 Claims, 5 Drawing Sheets

ANTI-BIRD COVER FOR A WATERCRAFT

FIELD OF INVENTION

This invention relates to the class of ships and the sub-classification for personal watercraft covers. Specifically, this invention relates to an anti-bird cover for watercraft which prevents birds from landing on, and fouling, the watercraft.

BACKGROUND OF INVENTION

Aquatic birds, like sea gulls and herons, often perch on boats and personal watercraft that are moored on or near the shore. Birds tend to flock, meaning that where there is one bird, more will follow. As a result, bird flocks often perch and rest on boats and personal watercraft. Whether one bird or a hundred birds, owners of boats and personal watercraft know that birds leave excrement. Birds foul boat and personal watercraft covers with excrement, and will foul all exposed surfaces. It is a problem encountered by most boat and watercraft owners at one time or another. On some inland lakes, the problem is severe, significantly hampering the usefulness of boats and watercraft due to the significant excrement build-up.

Bird droppings are a problem from both an aesthetic and health perspective. Just looking at a boat covered in excrement can be disturbing. Prior to using their boat or personal watercraft, owners and users have to carefully removed a fouled cover, preferably without contaminating themselves with excrement. Then, owners and users have to clean the excrement from user surfaces, significantly impairing the enjoyment of boating. Birds are also carriers of many diseases, some of which are transmitted to humans via bird droppings: Histoplasmosis, Candidiasis, Cryptococcosis, St. Louis Encephalitis, *Salmonellosis*, and *E. coli*, inter alia. Some diseases, like histoplasmosis, can actually be deadly.

Although this is a problem encountered by many, if not most, boat owners, there are surprisingly few effective countermeasures. There is a market demand for a device that stops birds from fouling boats and personal watercraft. The solution should humane, inexpensive, easy-to-use, and effective.

PRIOR ART REVIEW

To truly meet the market demand, an anti-bird device for boats and personal watercraft should be humane, inexpensive, easy-to-use, and effective. When measured against this criterion, current offerings are lacking.

For example, U.S. Pat. No. 6,082,285, by named inventor Hinrichs, entitled, "Sea bird marine craft protector" ("Hinrichs '285") teaches an anti-bird net suspended over a boat on a frame. The anti-bird net is retracted and extended using a handle and roller mechanism. Hinrichs '285 teaches a net made out of rope that is pulled taut over the watercraft. Hinrichs '285 is a sub-optimal design because it is expensive, relatively difficult to use, and not particularly effective. First, the frame and net is much more expensive than a traditional cover. Second, the anti-bird net has to be mounted at a fixed location, which makes it of less practical use. Third, the anti-bird net of Hinrichs '285 requires an additional step in storing a boat. Fourth, Hinrichs '285 is not particularly effective, because birds are not deterred by it. Hinrichs '285 pulls the rope netting tight. Birds will perch on a taut rope—they do it all the time. Hinrichs '285 is not an effective solution to the market problem.

There are several other attempts to use netting to prevent birds from fouling a place or item. For example U.S. Pat. No. 5,410,982, by named inventor Mann, entitled, "Net over diving platform to prevent aquatic birds from perching" ("Mann '982") teaches a tightly pulled anti-bird net suspended over swimming platform.

There are several other attempts to prevent birds from fouling watercraft, such as U.S. Pat. No. 5,341,759, by named inventor Hood, entitled, "Sea bird deterrent for boats and navigation aids" ("Hood '759") teaches using cables or lines over a boat to deter birds; U.S. Pat. No. 7,500,451, by named inventor Rains, entitled, "Bird deterrent apparatus" ("Ingraham '451") teaches a variation of using lines over a boat to deter birds; U.S. Pat. No. 6,836,992, by named inventors Ingraham, et. al., entitled, "Bird repelling device" ("Rains '992") teaches an anti-bird system using a plurality of wires with end beads projecting from a vertical column.

There are also variations on traditional boat covers, which prevent birds from dropping excrement on the surface of the boat, at the cost of fouling the boat cover. For example, U.S. Pat. No. 8,800,469, by named inventor Musachio, entitled, "Boat cover" ("Musachio '469") teaches a variation of a canvas boat cover; U.S. Pat. No. 7,784,420, by named inventor Tufte, entitled, "Cover system for a boat" ("Tufte '420") teaches a variation of a boat cover that can be segmentally articulated to more than one cover position; U.S. Pat. No. 7,111,578, by named inventors Brooks et. al., entitled, "Watercraft cover" ("Brook '578"), teaches a reinforced boat cover that flexes away from a boat; U.S. Pat. No. 6,810,829, by named inventor McDaniel, entitled, "Protective cover for a boat having a tee-top" ("McDaniel '829"), teaches a boat cover reinforced with a frame. There are, of course, many other variations on a boat cover, but to review them would be merely cumulative.

An effective solution to the problem of birds fouling boats and personal watercraft would be humane, inexpensive, easy-to-use, and effective. Currently, there are no solutions to prevent birds from fouling boats or personal watercraft. There is clearly still a market need for such a device.

SUMMARY OF THE INVENTION

This summary is intended to disclose the present invention, an anti-bird cover for a watercraft. The embodiments and descriptions are used to illustrate the invention and its utility, and are not intended to limit the invention or its use. The present invention is easily scalable, making it of use for personal watercraft such as a jet ski, or for larger boats.

The present invention is an anti-bird cover for a watercraft that uses a planar sheet of plastic netting with a small, but not micro, aperture to deter birds from perching. It is well-known that many bird deterrents use netting. However, the effectiveness of the netting in actually deterring birds is highly variable. Sometimes, netting seems to prevent birds from perching, other times it seems to make the perfect perch for the bird.

The present invention teaches a planar sheet of plastic netting with a small aperture that is used as an exterior cover for personal watercraft and boats. The present invention uses a very loose fitting net, allowing the netting to billow in the wind. The combination of relatively small aperture (holes between 0.25" and 2" on a side) and billowing surface deters birds. The birds cannot effectively land on the cover, without risking ensnarement. Birds will not alight on a perch if there is a substantial risk that the bird will become entangled. Birds like to land on solid or fixed perches. A billowing cover made of plastic netting makes it impossible for a bird to land on the boat or the personal watercraft. The aperture size is larger than the foot of the bird.

The planar sheet of plastic netting can be fabricated from at least one of the following: nylon, polypropylene ("PP"), high-density polyethylene ("HDPE"), and low-density polyethylene ("LDPE"). The material needs to be abrasion, water, UV, flame and rot resistant. The mesh of the planar sheet of plastic netting is defined by a plurality of filiments, wherein each filament connects with a plurality of other filaments in a knot or node. Typically four filaments meet in each knot. The mesh can be any configuration, but the most common are square, diamond, or rectangular. The netting aperture size is dictated by filament length. Each filament should be at least 0.25," but no more than 2". The preferred mesh is a diamond mesh with filaments that are approximately 0.75" or 19 mm. The anti-bird cover for a watercraft should use at least 1.5 times as much netting as the surface area to be covered. The excess material is needed to allow the small aperture netting to billow or blow in the wind. Such motion acts as an impediment to birds trying to perch.

The cover has an elastic gather that is strung through the perimeter of the planar sheet of netting or through eyelets at the edge of the cover. The elastic gather allows the cover to be secured to the watercraft. The two ends of the elastic gather pass through a bungee cord stop mechanism that securely captures them, allowing the elastic to be tightened around the perimeter of the cover.

The netting should be the external most surface of the watercraft cover, but it can be combined with a more traditional, internal cover such as a canvas boat cover. Clearly, the internal cover fabric would not be sized to billow, as that would add expense without improving performance.

BRIEF DESCRIPTION OF THE DRAWINGS

The present invention is illustrated with 5 drawings on 5 sheets.

DETAILED DESCRIPTION OF THE DRAWINGS

The following descriptions are not meant to limit the invention, but rather to add to the summary of invention, and illustrate the present invention, an anti-bird cover for a watercraft. While embodiments of the invention are illustrated and described, the embodiments herein do not represent all possible forms of the invention. Rather, the descriptions, illustrations, and embodiments are intended to teach and inform without limiting the scope of the invention.

Figure 1:
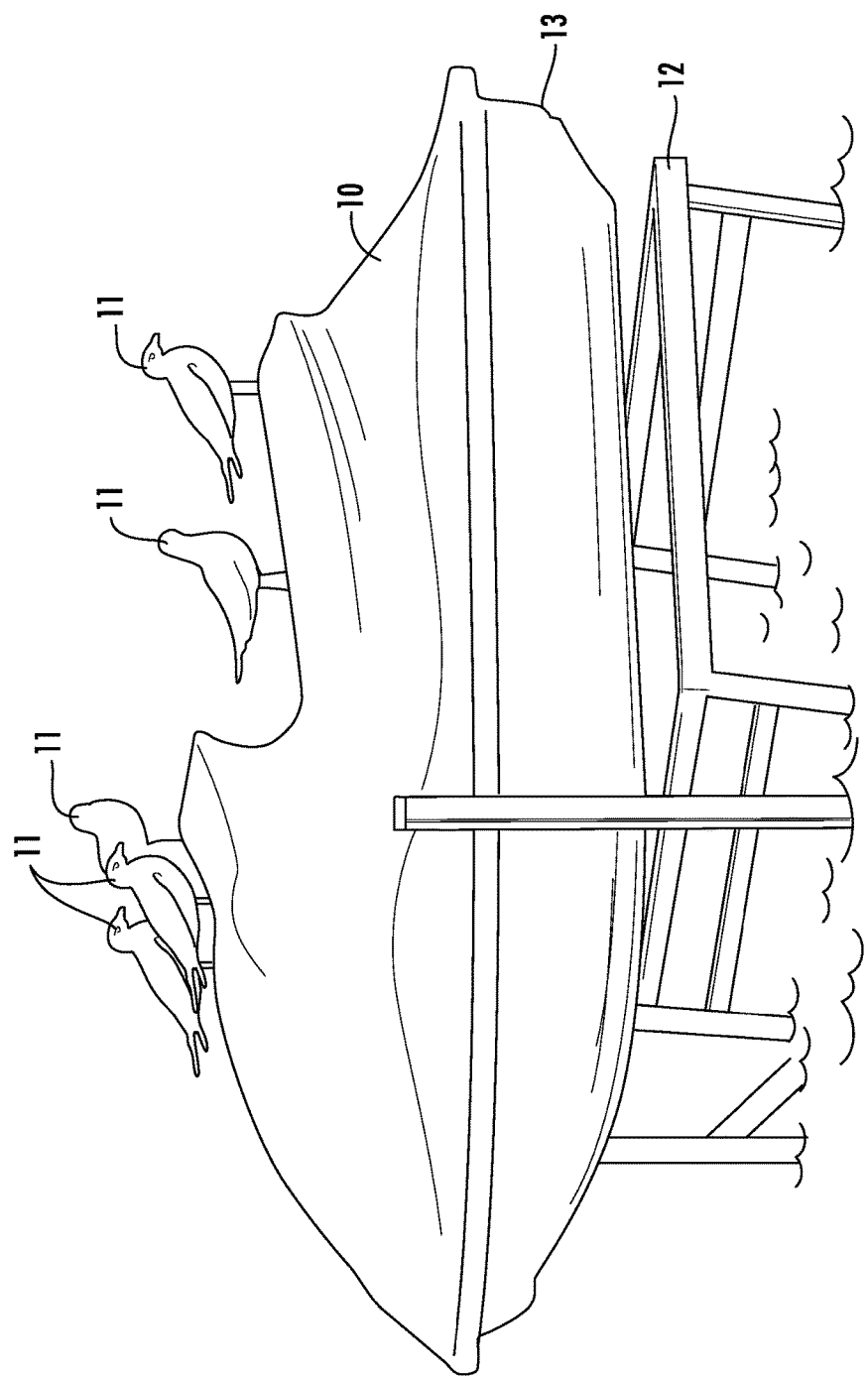
FIG. 1 is an isometric of a personal watercraft, in situ.

FIG. 1 illustrates a common problem for watercraft owners, especially personal watercraft owners. While stored, personal watercraft 13 are typically raised on a personal watercraft 13 dock or lift 12. The personal watercraft 13 is covered with a traditional cover 10. A plurality of bird 11 perch on the personal watercraft 13, fouling the cover 10.

Figure 2:
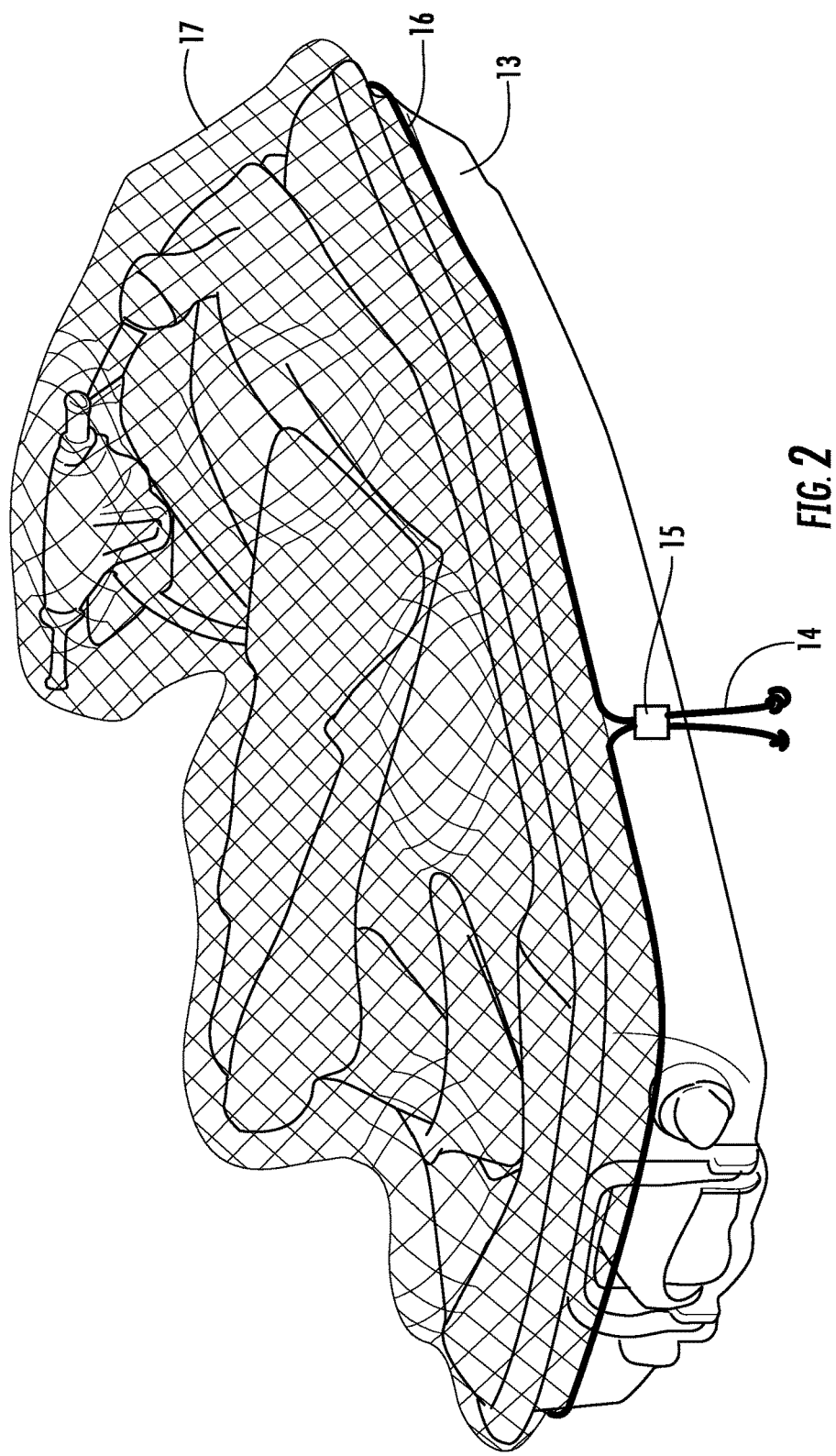
FIG. 2 is an isometric of a personal watercraft, in isolation, covered with the present invention.

FIG. 2-5 show the present invention, an anti-bird cover 1 for a personal watercraft in various aspects. In FIG. 2, the present invention 1 is used to cover a personal watercraft 13. The present invention 1 is comprised of netting 17, an elastic gather 16, and a bungee cord stop mechanism 15. Two free ends 14 of the elastic gather 16 project from the bungee cord stop mechanism 15.

Figure 3:
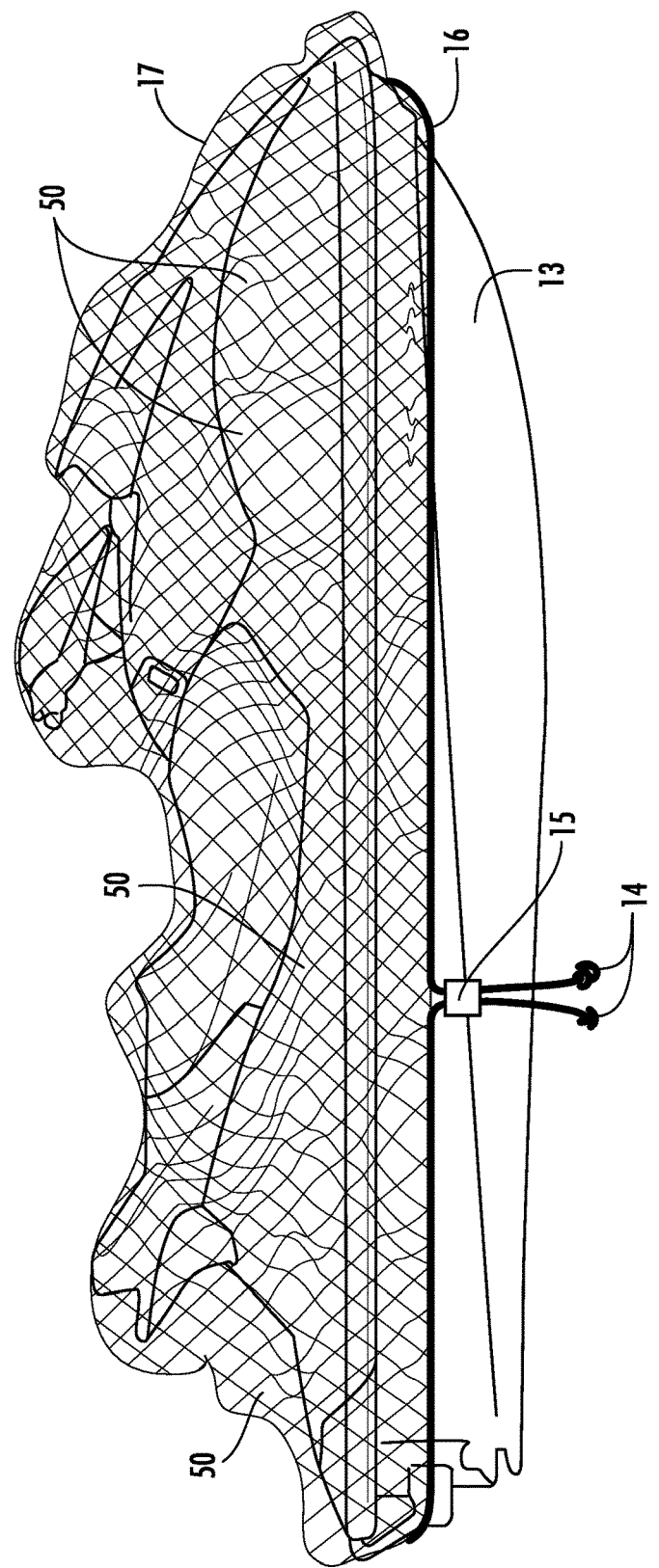
FIG. 3 is a lateral view of a personal watercraft, in isolation, covered with the present invention.

FIG. 3 is a lateral view of the present invention 1. It shows the present invention 1, in situ, on a personal watercraft 13. The netting 17, elastic gather 16, bungee cord stop mechanism 15, and two free ends 14 are visible. The netting 17 can be seen billowing at several locations 50 due to the abundance of netting 17 used in the present invention 1.

Figure 4:
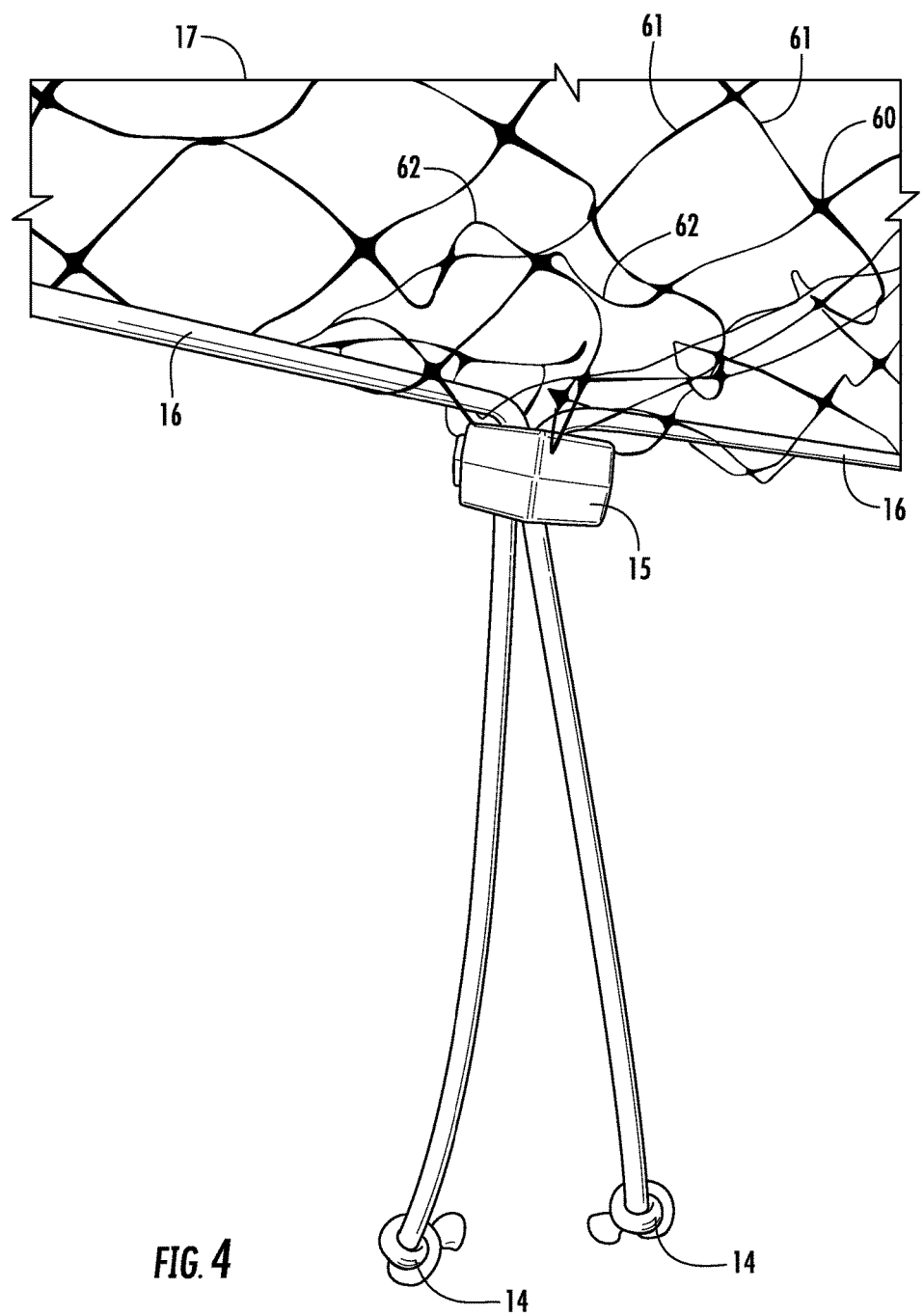
FIG. 4 is an isolation close-up view of the present invention.

FIG. 4 shows an isolation close-up of the present invention 1. The netting 17, elastic gather 16, bungee cord stop mechanism 15, and two free ends 14 are visible. The netting 17 is made from a plurality of filaments 61 that are joined at knots 60. Four filaments 61 meet at each knot 60 in this pattern. The elastic gather 16 is threaded through the netting 17, in order to gather the netting 17. The netting 17 terminates at the elastic gather 16. The filaments 61 bend at certain points 62 due to the abundance of netting 17 used in this application, which result in the billowing 50 on a macro-scale.

Figure 5:
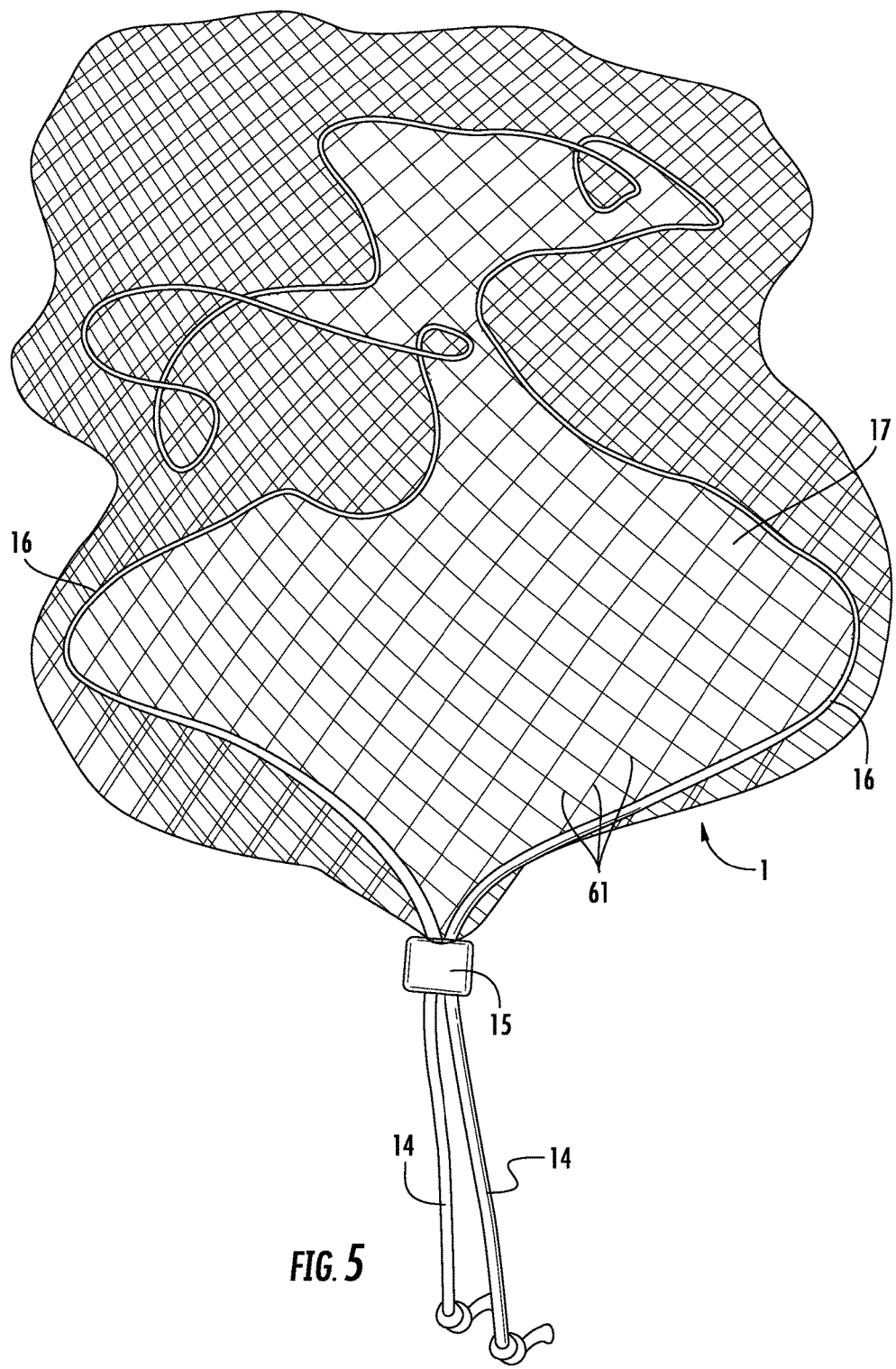
FIG. 5 is an isometric isolation view of the present invention.

FIG. 5 shows the anti-bird cover for a personal watercraft 1 in isolation. The netting 17, elastic gather 16, bungee cord stop mechanism 15, two free ends 14, and filaments 61 are visible. The elastic gather 16 is a single, continuous pieces of elastic. The netting 17 is a continuous sheet of planar material. The elastic gather 16 encircles the perimeter of the continuous sheet of planar material 17. The mesh of the netting is defined by a plurality of filiments 61 which are joined at knots 60. In the illustrated embodiment, four filaments 61 meet at each knot 60 to form a diamond mesh 61, 60. Alternative mesh configurations, such as square, triangular, rectangular, or spline are possible. The number of filaments 61 meeting at a knot 60 depends on the mesh shape. For example, a triangular mesh might have 6 filaments 61 joined by each knot 61. The netting aperture size is dictated by filament 61 length. Each filament 61 should be at least 0.25," but no more than 2". In the illustrated embodiment, the filaments 61 are approximately 0.75" (19 mm), with four filaments 61 meeting at each knot 60.

The plastic netting 17 can be fabricated from at least one of the following: nylon, polypropylene ("PP"), high-density polyethylene ("HDPE"), and low-density polyethylene ("LDPE"). The most common material is HDPE, which is abrasion, water, UV, flame and rot resistant. The anti-bird cover for a watercraft should use at least 1.5 times as much netting as the surface area to be covered. The excess material is needed to allow the small aperture netting to billow or blow in the wind. Such motion acts as an impediment to birds trying to perch.

I claim:
1. An anti-bird cover for a watercraft comprising;
    a planar sheet of plastic netting material comprised of a plurality of filaments and a plurality knots, wherein the filaments are joined at the knots, creating apertures defined by the plurality of filaments and plurality of knots;
    a continuous piece of elastic, with two free ends, capable of encircling the perimeter of the netting; and
    a bungee cord stop, capable of capturing the two free ends of the continuous piece of elastic;
    wherein the size of the planar sheet of plastic netting material is at least 1.5 times larger than the surface of the watercraft needing to covered;
    wherein the elastic is threaded through the plastic netting, with the plastic netting terminating at the elastic; and wherein the abundance of material in the planar sheet of plastic netting causes the anti-bird cover to billow when placed over a watercraft.

2. The anti-bird cover for a watercraft in claim 1, wherein the filaments are between 0.25" and 2.00".

3. The anti-bird cover for a watercraft in claim 2, wherein the filaments are all of equal length and radius.

4. The anti-bird cover for a watercraft in claim 3, wherein at least four (4) filaments are joined at each knot.

5. The anti-bird cover for a watercraft in claim 4, wherein the planar sheet of plastic netting is fabricated from at least one of nylon, polypropylene ("PP"), high-density polyethylene ("HDPE"), and low-density polyethylene ("LDPE").

6. The anti-bird cover for a watercraft in claim 5, wherein the planar sheet of plastic netting is abrasion resistant.

7. The anti-bird cover for a watercraft in claim 6, wherein the planar sheet of plastic netting is water resistant.

8. The anti-bird cover for a watercraft in claim 7, wherein the planar sheet of plastic netting is ultra-violet ("UV") light resistant.

9. The anti-bird cover for a watercraft in claim 8, wherein the planar sheet of plastic netting is flame resistant.

10. The anti-bird cover for a watercraft in claim 9, wherein the planar sheet of plastic netting is rot resistant.

11. The anti-bird cover for a watercraft in claim 10, wherein there are exactly four (4) filaments meeting at each knot.

12. The anti-bird cover for a watercraft in claim 11, wherein the filaments are all approximately 0.75" (19 mm) in length.

13. The anti-bird cover for a watercraft in claim 12, wherein the filaments and knots form a diamond mesh.

14. The anti-bird cover for a watercraft in claim 12, wherein the filaments and knots form a square mesh.

15. The anti-bird cover for a watercraft in claim 12, wherein the filaments and knots form a rectangular mesh.

* * * * *